United States Patent
Aranda

(10) Patent No.: US 8,579,223 B2
(45) Date of Patent: Nov. 12, 2013

(54) SAFETY BELT RETRACTOR WITH CUTOFF OF ITS BELT-WEBBING-SENSITIVE AND ITS VEHICLE-SENSITIVE CONTROL SYSTEM

(75) Inventor: Guillem Aranda, Hamburg (DE)

(73) Assignee: Autoliv Development AB, Vargärada (SE)

( * ) Notice: Subject to any disclaimer, the term of this patent is extended or adjusted under 35 U.S.C. 154(b) by 620 days.

(21) Appl. No.: 12/517,303

(22) PCT Filed: Nov. 28, 2007

(86) PCT No.: PCT/SE2007/010303
§ 371 (c)(1),
(2), (4) Date: Nov. 11, 2010

(87) PCT Pub. No.: WO2008/064870
PCT Pub. Date: Jun. 5, 2008

(65) Prior Publication Data
US 2011/0089282 A1   Apr. 21, 2011

(30) Foreign Application Priority Data

Dec. 2, 2006  (DE) .......................... 10 2006 057 018

(51) Int. Cl.
*B60R 22/405*   (2006.01)
*B60R 22/41*    (2006.01)
*B60R 22/415*   (2006.01)

(52) U.S. Cl.
USPC ................. 242/382.2; 242/383.1; 242/383.2; 242/384.1

(58) Field of Classification Search
USPC .......... 242/382.1, 382.2, 383.1, 383.2, 384.1; 280/806, 807; 297/476, 478
See application file for complete search history.

(56) References Cited

U.S. PATENT DOCUMENTS

| | | | |
|---|---|---|---|
| 3,862,726 A | | 1/1975 | Ulrich et al. |
| 4,485,986 A | * | 12/1984 | Sugimoto ................. 242/383.1 |
| 4,763,853 A | * | 8/1988 | Andersson ................ 242/383.1 |
| 4,834,313 A | * | 5/1989 | Tsukamoto ............... 242/383.1 |
| 4,993,656 A | * | 2/1991 | Tsuge et al. .............. 242/383.1 |
| 5,484,118 A | * | 1/1996 | Fujimura et al. .......... 242/384.2 |
| 5,826,813 A | * | 10/1998 | Hibata ...................... 242/383.1 |

FOREIGN PATENT DOCUMENTS

| | | |
|---|---|---|
| DE | 39 13 631 A1 | 10/1990 |
| DE | 103 60 032 A1 | 3/2006 |

OTHER PUBLICATIONS

PCT/EP2007/010303 Initial Publication with International Search Report.

* cited by examiner

*Primary Examiner* — Sang Kim
*Assistant Examiner* — Scott Haugland
(74) *Attorney, Agent, or Firm* — Brinks Gilson & Lione

(57) ABSTRACT

A self-locking belt retractor for motor vehicles with a vehicle-sensitive and a belt-webbing-sensitive control system for the blocking arrangement of the belt retractor, is characterized in that for the formation of its inertia, an inertial mass is swivellably mounted on a control disk, wherein the inertial mass can be deflected into a blocking position for the control disc. Additionally, a locking lever mounted on the control disc is provided for the cutoff of a vehicle sensor, and by way of a switching process in its cutoff position, the locking lever cuts off the vehicle sensor and secures the inertial mass in a disabling position, the disabling position being different than the blocking position.

23 Claims, 12 Drawing Sheets

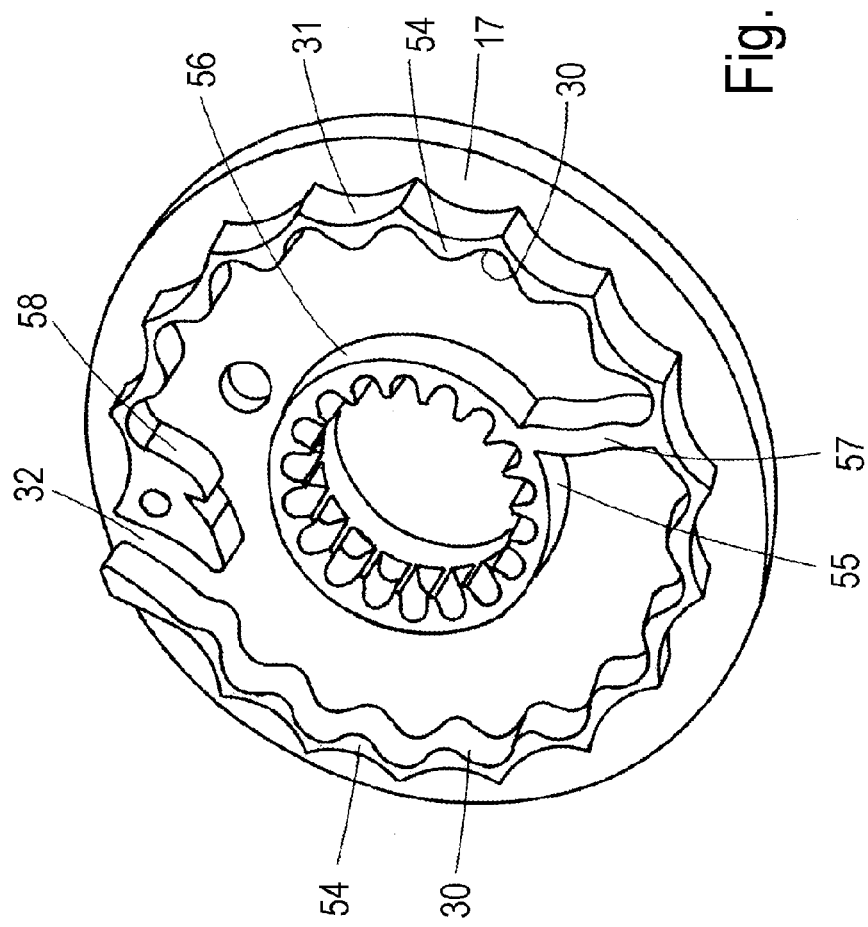

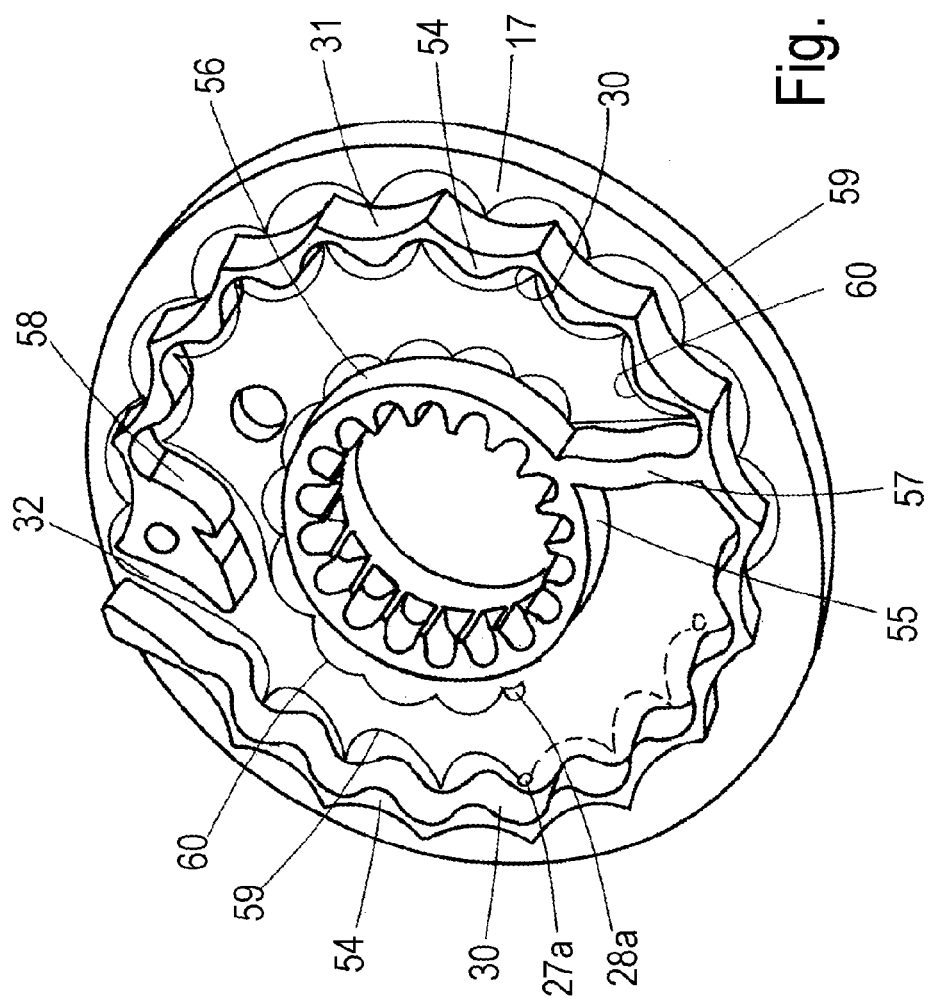

US 8,579,223 B2

SAFETY BELT RETRACTOR WITH CUTOFF OF ITS BELT-WEBBING-SENSITIVE AND ITS VEHICLE-SENSITIVE CONTROL SYSTEM

CROSS REFERENCE TO RELATED APPLICATION

This application claims priority to International Application No. PCT/EP2007/010303, filed Nov. 28, 2007, which is based on and claims priority to German Patent Application No. DE 10 2006 057 018.9, filed Dec. 2, 2006.

FIELD OF THE INVENTION

The invention relates to a self-locking belt retractor for motor vehicles, with a vehicle-sensitive and a belt-webbing-sensitive control system for a locking device of the belt retractor. The belt retractor includes a toothed wheel able to be guided into a toothing fixed to the housing of the belt retractor, wherein the control system comprises a control disc rotating with the belt shaft. The control disc is coupled to the toothed wheel and in order to form its inertia, the control disc is constructed with an inertial mass swivellably mounted thereon for the formation of the belt-webbing-sensitive control. The control disc includes an outer toothing for engaging a sensor lever arranged on a vehicle sensor, wherein at least one locking lever being controlled by rotation of the belt shaft, and swivellable between an activation position and a cutoff position, is provided for the cutoff of the vehicle sensor in a functional range in which almost the entire safety belt is wound on the belt shaft, and wherein an arrangement is provided for the cutoff of the belt-webbing sensitive control in the functional range of the belt retractor.

BACKGROUND OF THE INVENTION

A belt retractor with the above-mentioned features is described in DE 103 60 032 A1. In order to prevent a blocking mechanism of the belt retractor from blocking a belt spool at the end of the winding of a safety belt after the safety belt has been taken off by a vehicle occupant and the safety belt is rolled up under the action of a winding spring (or when the safety belt is abruptly braked), the above-mentioned publication provides a cutoff (or disabling) of the belt-webbing-sensitive and the vehicle-sensitive control system so that an undesired blocking of the belt shaft at the end of the winding of the safety belt is prevented.

For this, in the known belt retractor, a locking disc is arranged on the belt shaft and is rotatable therewith, wherein the locking disc controls, by means of a guide curve arranged on it, a locking lever which is swivellably mounted in a fixed manner relative to the housing of the belt retractor. In a functional range in which almost the entire safety belt is wound on the belt shaft, the locking lever acts directly on a sensor lever of a vehicle sensor cooperating with a control disc, and secures it, thereby cutting off the vehicle-sensitive control system. Insofar as the belt-webbing-sensitive control system is realized by the control disc, wherein the control disc is constructed with a corresponding mass moment of inertia, a blocking catch mounted on the belt shaft is provided to cut off the belt-webbing-sensitive control system. For its actuation, the blocking catch is coupled via a guide link to the locking lever for the cutoff of the vehicle sensor. When the blocking catch is in its blocking position, brought about by the locking position of the locking lever, it is in engagement with the control disc and locks the control disc so as to be locked against relative rotation with the belt shaft.

Furthermore, the known belt retractor has an Automatic Locking Retractor (ALR) and/or an Emergency Locking Retractor (ELR) switchover for setting a child safety function, which is controlled by the locking disc by means of switching (or trip) cams constructed thereon. In the ALR switching position, which is activated by almost complete withdrawal of the safety belt for securing a child's seat to the vehicle seat, the control disc is locked on a toothing fixed to the housing, so that on withdrawal of the seat belt in the ALR switching position, owing to the stationary control disc, a blocking of the belt retractor is immediately triggered.

The known belt retractor entails the disadvantage that for the cutoff of both the vehicle-sensitive and of the belt-webbing-sensitive control system, various levers are provided, whereby the construction of the belt retractor is complicated and the manufacturing expenditure is correspondingly great. In addition, the cutoff of the two control systems can only take place in succession, because the actuation of the locking lever for the vehicle sensor is a precondition for the controlling of the blocking catch for the belt-webbing sensitive control system. As several control processes are necessary, there exists a corresponding potential for error.

Therefore, one object of the present invention is to simplify a self-locking belt retractor with regard to the cutoff of the vehicle-sensitive and also of the belt-webbing-sensitive control system, and to improve the reliability of the cutoff function accordingly.

The solution to this task, including advantageous developments and further developments of the invention, can be seen from the content of the claims, which follow this description.

SUMMARY OF THE INVENTION

In its basic idea, the invention provides that for the formation of inertia on of the control disc, an inertial mass is swivellably mounted thereon, and is deflectable into a blocking position for the control disc. Additionally, a locking lever for disabling a vehicle sensor is also mounted on the control disc. According to a switching process in a cutoff position of the locking lever, the locking lever cuts off the vehicle sensor and also secures the inertial mass in a disabling position which is different from the blocking position. Unlike the prior art, the mass moment of inertia of the control disc is produced by an inertial mass which is pivotably mounted on the control disc, whereby the vehicle sensor is cut off and the inertial mass is secured from potential movement by way of a single locking lever, and wherein the belt-webbing-sensitive control system is cut off at the same time. Accordingly, the invention also entails the advantage that only a single component and a single switching process are necessary in order to cut off (or disable) both control systems together. As the locking lever is likewise mounted on the control disc itself, all the components necessary for the cutoff are concentrated on the control disc, so that the structure of the belt retractor is simplified.

With regard to the cutoff of the vehicle sensor, an exemplary embodiment of the invention provides that the control disc is constructed in two parts. First, the control disc includes a rotatable platform coupled to the belt shaft, wherein the platform acts as a carrier for the inertial mass and the locking lever. Secondly, the control disc includes an outer ring rotatable with respect to the platform. The outer ring has an outer toothing for engaging the sensor lever of the vehicle sensor, and an inner toothing for engaging the locking lever in its activation position. Insofar as the sensor lever of the vehicle sensor (arranged outside the control disc) engages onto the outer teeth of the separate ring, the locking lever is in engagement with the inner toothing of the ring in the functional position of the control disc, so that in this position of the locking lever, an externally toothed locking disc according to the prior art is formed. In this respect, it is merely necessary for the cutoff of the vehicle-sensitive control system to guide the locking lever out of engagement with the inner toothing of the separate ring, because here, even in the case of an engagement of the sensor lever into the outer toothing of the ring, the platform rotates as carrier of the locking lever with respect to the ring, so that the control disc rotates further with the belt shaft. As such, the necessary relative rotation between the control disc (or platform) and the belt shaft to initiate the blocking of the belt retractor does not occur.

With regard to the construction of the belt-webbing-sensitive control system by means of an inertial mass pivotably mounted on the control disc, provision is made that the inertial mass has a blocking tooth arriving in its blocking position in engagement with a peripheral toothing formed on the inner side on a housing cap overlapping the control system. In this respect, the belt-webbing-sensitive control system is realized in that with the occurrence of a correspondingly high rotational acceleration of the control disc or of the platform as carrier of the inertial mass, the inertial mass is deflected and its blocking tooth comes in engagement with the toothing which is fixed to the housing. Thus, the inertial mass is hereby secured and since it is mounted on the platform of the control disc, the inertial mass stops further rotational movement of the control disc, thereby initiating the relative rotation between the platform of the control disc and the belt shaft, which is necessary for the blocking of the belt retractor.

Through the swivelling of the locking lever, therefore, with a switching process necessary for the function of the vehicle sensor, the ring of the control disc is released and the inertial mass is secured against potential swivelling, so that with one switching process both control systems are disabled.

Insofar as the belt retractor of the present invention corresponds to the prior art in that in addition to the belt-webbing-sensitive and the vehicle-sensitive control system, the belt retractor must also have an ALR/ELR switchover, an exemplary embodiment of the invention provides an additional switching lever swivellably mounted on the control disc for the ALR/ELR switchover between two switching positions. In the ALR switching position, the switching lever is configured to engage with the peripheral toothing of the housing cap, and in the ELR switching position, the switching lever is not in engagement with the peripheral toothing. Since the switching lever for the ALR/ELR switchover is mounted on the control disc itself or on the associated platform, the structural expenditure is correspondingly reduced. With regard to the function of the ALR/ELR switchover, details and illustrations are disclosed in DE 103 60 032 A1, the disclosure of which is hereby incorporated by reference in its entirety for all purposes.

According to an exemplary embodiment of the present invention, insofar as the switching lever does not engage with the peripheral toothing of the housing cap during the ELR switching state, provision is made that the switching lever is secured with a spring arm on a structural part of the control disc, wherein in its radially deflected ALR switching position, the spring arm comes out of engagement with the structural part of the control disc. Owing to the spring engagement, which is thus set, incorrect controlling of the switching lever is avoided.

For the controlling of both the locking lever and of the switching lever, reference is made to the principle disclosed by DE 103 60 032 A1 of controlling the respective levers via cams. In this regard, an exemplary embodiment of the present invention provides for simultaneously controlling both the locking lever and the switching lever of a wobble plate with cams formed thereon, wherein the wobble plate is arranged adjacent to the control disc and is driven by the belt shaft. In particular, guide pins, respectively formed on the locking lever and on the switching lever, are provided and guided on the cams.

With regard to the driving of the wobble plate, an exemplary embodiment of the invention provides that the wobble plate is placed with an eccentrically arranged, internally toothed bearing bore on an externally toothed extension of the control disc, so that the rotary movement of the control disc together with the belt shaft can be converted into rotary movement of the wobble plate. To fix the wobbling movement of the wobble plate, the wobble plate is guided in a bearing formed eccentrically in the housing cap. In this way, the wobbling rotation of the wobble plate respectively provides a measurement for the winding or unwinding status of the belt webbing, which may be converted to control the locking lever and switching lever.

With regard to the cams formed on the wobble plate for controlling both the locking lever and the switching lever, an exemplary embodiment of the invention, provides that the wobble plate has a strip extending at least over a partial circumference and projecting axially into the plane of the guide pins of the locking lever and switching lever, and a bearing ring projecting parallel to the strip, the bearing ring being provided for the formation of the cams for controlling the guide pins. According to one aspect of the invention, the strip is arranged with a radial distance from both the bearing ring and the outer periphery of the wobble plate, and on its inner side a cam is formed and on its outer side a cam is formed for the guide pin of the locking lever. Additionally, at least one opening is provided as a radial transition section for the passage of the guide pin between the inner cam and the outer cam.

Therefore, through the arrangement of the strip with the cams formed on it, two regions on the wobble plate are separated from each other, in which the movements of the two guide pins, which are controlled by the wobble plate, take place according to the unwinding status of the belt webbing. Here, due to the radial displacement of the wobble plate taking place in combination with the rotary movement of the wobble plate, the cams are formed so that the cams have an undulating contour on their running paths for the guide pins of the locking lever and switching lever, wherein the undulating contour is configured to equalize movement of the wobble plate with respect to the guide pins of the locking lever and switching lever, rotating with the control disc.

According to one embodiment of the invention, the strip with the cams formed thereon extends over the entire periphery of the wobble plate such that the guide pin of the locking lever is guided on the cams during the entire winding and unwinding movement of the belt webbing.

In particular, at the start of the belt webbing withdrawal, with a very high withdrawal acceleration (e.g., a withdrawing acceleration exceeding a predetermined value), the guide pin of the locking lever can strike so powerfully against the inner guide curve of the strip that the guide pin breaks off; in such a case, further use of the belt retractor would no longer be guaranteed, because the locking lever would no longer be able to be controlled to produce the control disc function. In order to provide a remedy here, provision can be made that the strip with the cams formed thereon extends only over a partial region of the periphery of the wobble plate, which is traveled through by the guide pin of the locking lever after initial belt webbing withdrawal in its position guided outwards in engagement with the inner toothing of the ring. In the remaining peripheral region, radially outward directed cross-pieces, spaced apart from each other, are arranged on the wobble plate to receive the guide pin of the locking lever between them. If the belt were accordingly withdrawn with a very high initial acceleration, then the guide pin of the locking lever can move between the radially aligned cross-pieces and not be stressed in this respect. At the same time, however, the belt-webbing-sensitive control system would respond with a deflection of the inertial mass, in which a blocking of the belt shaft against further belt withdrawal would occur. In order to release the blocking, the belt webbing must be slackened before a slower withdrawal movement can then take place again without stressing the guide pin which is situated on the locking lever.

For further protection of the guide pin of the locking lever, provision can be made in such a case that on the initial withdrawal of the belt webbing, the cross-pieces traveled through by the guide pin in the peripheral direction are arranged in an adapted position, such that the cross-pieces are aligned obliquely to the peripheral direction. At their inner end, the cross-pieces have a flattened introduction surface for the guiding in of the guide pin between the cross-pieces, so that the guide pin of the locking lever, following the quick initial rotation of the wobble plate, also does not directly impact the cross-pieces.

Insofar as the switching lever for the ELR-ALR switchover is not engaged with the toothing formed on the housing cap during the ELR switching state, an exemplary embodiment of the invention provides that the outer periphery of the bearing ring of the wobble plate forms a third cam for controlling the guide pin of the switching lever during the ELR switching state of the switching lever. Here to better guide the guide pin of the switching lever during the ELR switching state, it is proposed that the contact surface of the guide pin, which is directed towards the bearing ring of the wobble plate, is constructed with a curvature corresponding to the outer curvature of the bearing ring.

For the radial deflection of the switching lever, which is necessary in the switchover from ELR to ALR operation, it is proposed that between the bearing ring and the strip, a radial cross-piece is arranged to radially control the guide pin of the switching lever out of its cam, which is formed by the bearing ring, so that is abuts against the inner cam of the strip during the ALR switching state, which is reached by the guide pin at the end of the belt webbing withdrawal. In a peripheral distance from the cross-piece, the inner cam has a section, directed radially inwards to the bearing ring, for the controlling of the guide pin from the inner cam of the strip to the cam on the bearing ring.

The circumstance can also occur that in the case of a very rapid belt webbing withdrawal, on reaching the ELR/ALR switchover point, the guide pin situated on the switching lever breaks off, so that a switching back to the ELR operation is not possible due to a faulty return of the switching lever on the inner cam of the strip. In order to nevertheless make possible a switching back in such a case, provision can be made that the locking lever and switching lever are arranged in different planes, staggered in the axial direction of the control disc, and the locking lever has an attachment extending into the movement plane of the switching lever and carrying the guide pin, wherein the attachment cooperates with the switching lever in at least one switching position of the locking lever. When the locking lever, on rolling up of the belt webbing such that the belt webbing is sufficiently wound, changes from the outer cam into the inner cam, the locking lever presses the switching lever back via its attachment, even in the absence of the guide pin in its abutment characterizing the ELR operation on the third cam on the periphery of the bearing ring. For structural reasons, provision can be made that for the production of the necessary motion clearance for the switching pin, the inertial mass extends in its axial height over both movement planes of the locking lever and switching lever, and has a cutout to receive the switching lever, wherein the cutout is arranged in the movement plane of the switching lever. As such, a space-saving compact construction of the components which are to be arranged on the control disc can be achieved.

According to an exemplary embodiment of the invention, at least one locking tooth is arranged on the locking lever, and in its cutoff position, the locking tooth engages into a peripheral recess formed on the belt shaft for the secure connection of belt shaft and control disc. Thus, in the cutoff position of the locking lever, the locking lever non-rotatably locks the control disc or its platform with the belt shaft, so that during a safety function, relative movement of the control disc and belt shaft with respect to each other, which would initiate the blocking of the belt retractor, is ruled out.

To improve the mounting of the belt retractor, an exemplary embodiment of the invention provides that the control disc with the functional parts of the inertial mass, locking lever, and switching lever mounted thereon, as well as the wobble plate, is able to be inserted into the housing or covering cap, formed in a cup shape, for the formation of a pre-mounted assembly, and is able to be secured therein. In this respect, in the final mounting of the belt retractor, the belt shaft with a shaft extension formed thereon only needs to be connected to the pre-mounted assembly.

In detail, an exemplary embodiment of the invention provides that the control disc and wobble plate are arranged together on an adapter piece, and the adapter piece is able to be secured in the housing cap on one hand, and on an extension of the belt shaft on the other hand, thereby forming the bearing of the belt shaft in the housing cap, wherein the adapter piece is respectively engageable with the housing cap and shaft extension. Furthermore, the adapter piece may be secured with a form fit on the shaft extension.

The pre-mounting of the belt retractor according to the invention is then facilitated, insofar as an exemplary embodiment provides that the adapter piece carries the control disc on an encircling flange and thereby forms the pre-mounted assembly which is to be engaged with the housing cap, wherein the shaft extension can be fixedly inserted into the adapter piece which is secured on the housing cap.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

Example embodiments of the invention are shown in the drawings, which are described below. The drawings show:

FIG. 10 is an enlarged perspective view of a wobble plate with cams formed thereon, FIG. 11 is a perspective view of the wobble plate according to FIG. 10 with movement paths for guide pins of a locking lever and a switching lever formed on the cams.

DETAILED DESCRIPTION OF THE INVENTION

Figure 1:
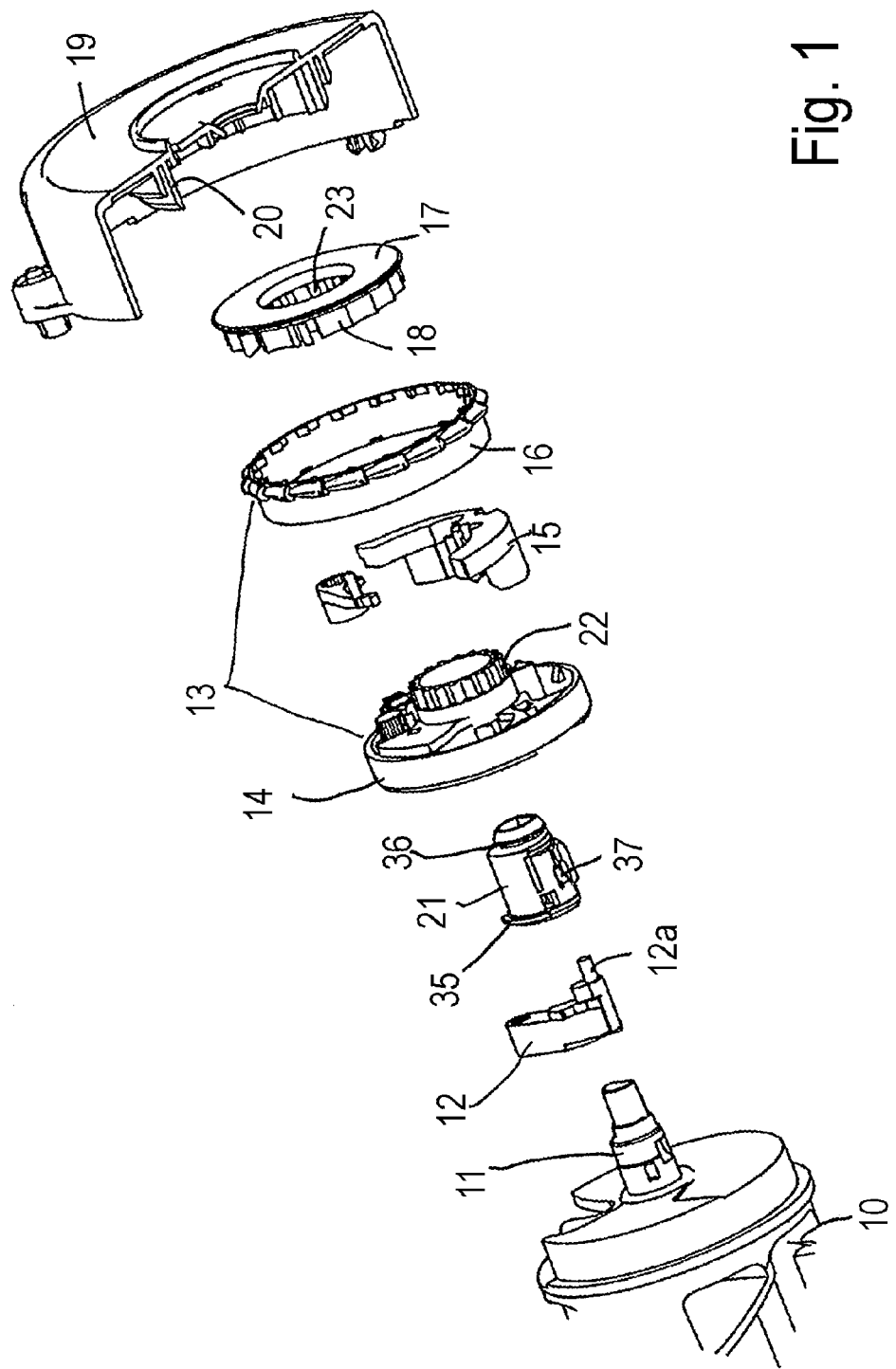
FIG. 1 is an exploded fragmentary view of a system side of a self-locking belt retractor with belt-webbing-sensitive and vehicle-sensitive control systems.
Figure 2:
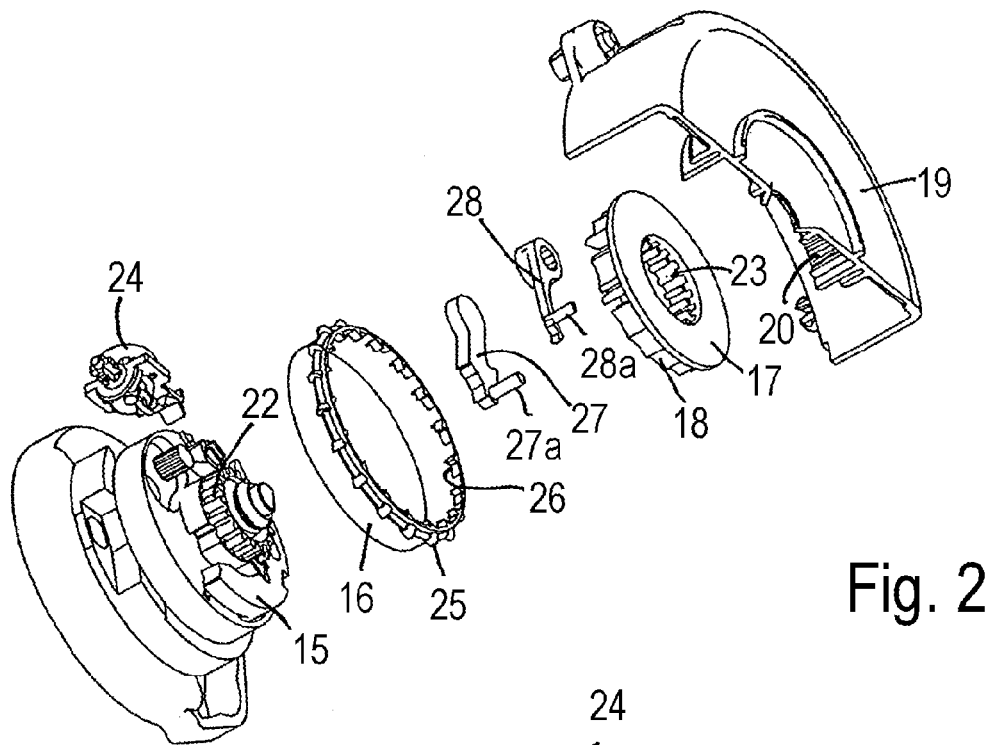
FIG. 2 is a fragmentary view of FIG. 1 according to another perspective.
Figure 3:
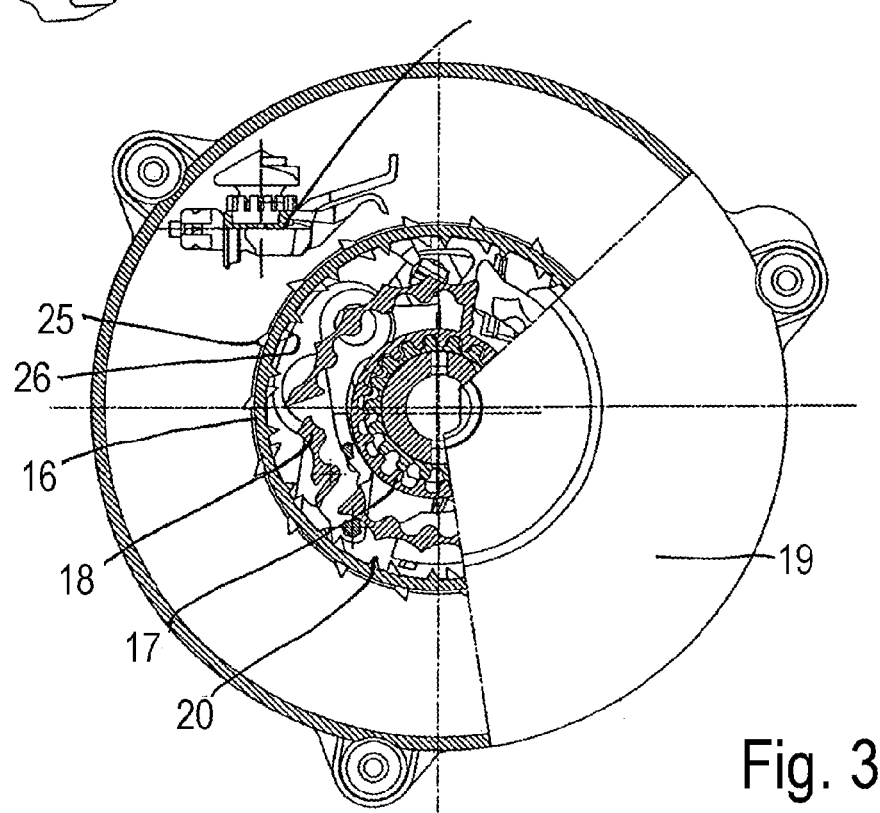
FIG. 3 is an enlarged top view of the system side of the belt retractor with assembled individual parts.

As can be seen firstly from FIGS. 1 and 2, a system side of a self-locking belt retractor is shown comprising a belt shaft 10 with a shaft extension 11 projecting therefrom along a shaft axis defined by the belt shaft 10, wherein the belt shaft 10 serves as mounting means and as drive means for the system parts connected to the belt shaft 10. A blocking catch 12 is mounted on the belt shaft 10 and is able to be swung out radially for engagement into a toothed blocking (not illustrated) fixed to the housing, wherein the blocking catch 12 has a guide pin 12a projecting in the shaft axis. The guide pin 12a engages into a link formed on a control disc 13, such that the control disc 13 rotates respectively together with the belt shaft 10. In the case of a response by a vehicle-sensitive and/or belt-webbing-sensitive control system which is to be described below, the control disc 13 is blocked from further rotary movement, so that relative rotation is produced between the stationary control disc 13 and the rotating belt shaft 10, wherein this relative rotation is converted by the guide pin 12a, which is guided in the control disc 13, into the radial deflection of the blocking catch 12. This radial blocking principle is known to those of ordinary skill in the art and will therefore not be described in greater detail.

An essential functional component of the belt retractor is the control disc, designated by 13, which consists of a platform 14 and a ring 16 externally surrounding the platform 14. On the platform 14 of the control disc 13, an inertial mass 15 is swivellably mounted swivellably thereon, which forms the belt-webbing-sensitive control system described below.

A wobble plate 17 arranged adjacent to the control disc 13 and cooperating functionally therewith, has cams 18 on its underside facing the control disc 13. The wobble plate 17 includes a recess having an inner toothing 23 for slidably engaging an externally toothed extension 22 of the platform 14, so that when the control disc 13 is rotating with the belt shaft 10, the control disc 13 drives the wobble plate 17 and entrains it in a rotating manner.

The system side of the belt retractor is surrounded and covered by a housing cap 19 having an internal toothing 20 fixed to the cap 19 on its inner side.

The functional parts of the system side of the belt retractor described above are held together by an adapter piece 21 which carries the platform 14 of the control disc 13 by a projecting flange 35. At its end facing the housing cap 19, the adapter piece 21 has a detent groove 36 which can be inserted into a corresponding detent configuration on the inner side of the housing cap 19 so that the adapter piece 21 is able to be engaged thereon. As the control disc 13 and the wobble plate 17 are arranged on the adapter piece 21, a pre-mounted assembly is produced by way of the control disc 13 and the wobble plate 17 being able to be secured with the associated functional parts (discussed below) on the housing cap 19 via the adapter piece 21.

The shaft extension 11 of the belt shaft 10 engages into the adapter piece 21 with a form-fitting connection, wherein the adapter piece 21 is able to be engaged with the shaft extension 11 of the belt shaft 10 via a detent window 37 during the final mounting of the belt retractor.

As can be further seen from FIG. 2, the ring 16 has both an outer toothing 25 and an inner toothing 26. Outside the control disc 13, a vehicle sensor 24 is secured on the inner side of the housing cap 19, wherein a sensor lever of the vehicle sensor 24 comes into engagement with the outer toothing 25 of the ring 16 of the control disc 13 based on corresponding vehicle accelerations or vehicle decelerations as understood to those of ordinary of skill in the art, and thereby blocks the ring 16 from further rotary movement.

On the platform 14 of the control disc 13, a locking lever 27 is swivelably mounted between an activation position and a cutoff or disabling position. In the activation position, the locking lever 27 is in engagement with the inner toothing 26 of the ring 16. As such, the externally toothed ring 16 is therefore connected to the platform 14 via the locking lever 27, so that in light of conventional control discs, a control disc 13 is formed which is capable of functioning. When the sensor lever of the vehicle sensor 24 engages into the outer toothing 25 of the control disc 13 during this activation position, the control disc 13 is stopped from further rotary movement and the blocking movement of the blocking catch 12 is brought about. On the other hand, when the locking lever 27 is controlled such that it is not in engagement with the inner toothing 26 of the ring 16, which is in fact in engagement with the sensor lever of the vehicle sensor 24 via the outer toothing 25 of the ring 16, the ring 16 remains at a standstill, but the platform 14, which is connected to the belt shaft 10, continues to rotate, so that the necessary relative rotation is not brought about; thus, the vehicle-sensitive control system is cut off.

Figure 4:
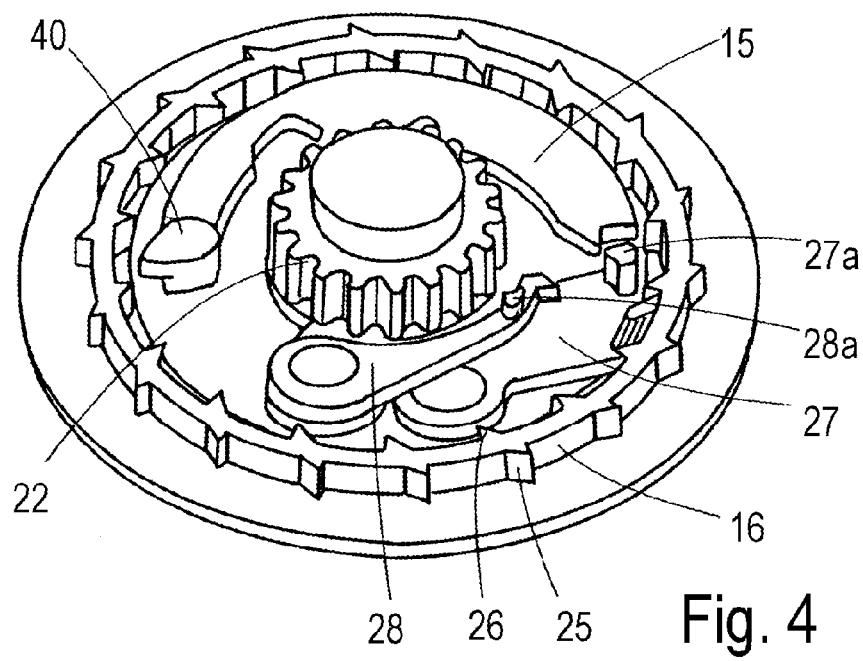
FIG. 4 is a perspective view of a control disc with functional elements arranged thereon during activation of the vehicle-sensitive and of the belt-webbing-sensitive control system.

As can be further seen from FIG. 4, the belt-webbing-sensitive control system is realized through the arrangement of the inertial mass 15 mounted movably on the platform 14. During normal rotations of the shaft 10, the inertial mass 15 lies within the contour of the platform 14, so that the platform 14 or the control disc 13 rotates together with the belt shaft 10. If a rapid belt withdrawal movement occurs, then the inertial mass 15 remains behind the rotating platform 14 and is thereby deflected. With this deflection, a blocking tooth 40 formed on the inertial mass 15 engages into the toothing 20 of the housing cap 19, so that further rotary movement of the control disc 13 is stopped and the relative rotation between the control disc 13 and belt shaft 10 occurs, thereby bringing about the blocking of the belt retractor.

Figure 5:
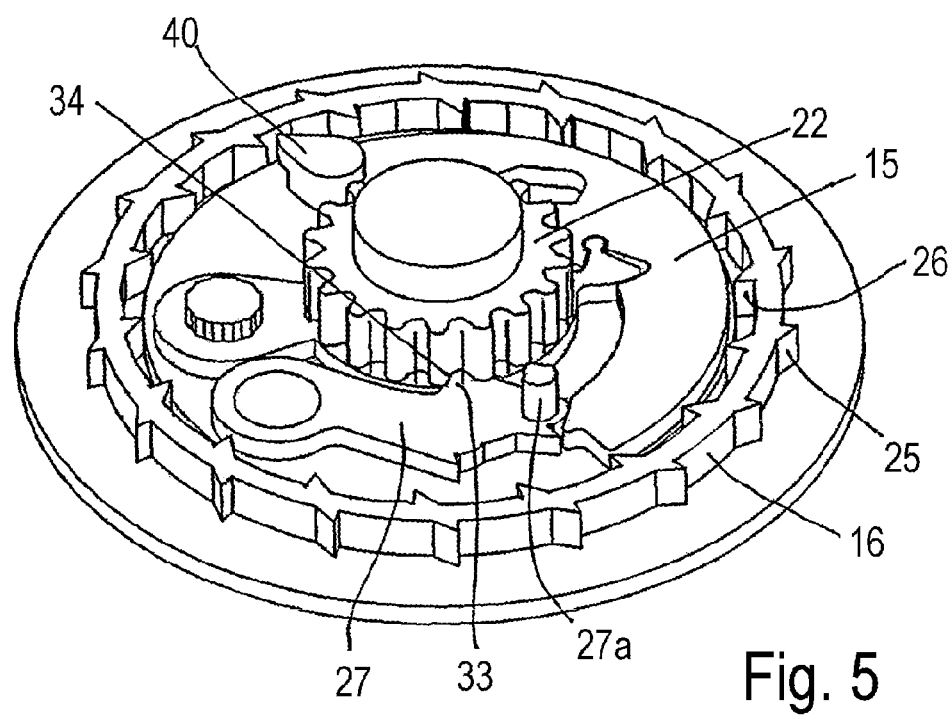
FIG. 5 is a perspective view FIG. 4 wherein the control systems are in a cutoff state.

It can be seen from FIG. 5 that the locking lever 27 is arranged on the platform 14 such that in its inwardly swiveled position, wherein the locking lever 27 is not in engagement with the inner toothing 26, it abuts against the inertial mass 15 which is mounted so as to be swivellably movable, and thereby secures the latter against swivelling movement. As the inertial mass 15 is therefore secured by the locking lever 27, the function of the inertial mass 15 described above can no longer occur in the case of rapid belt webbing withdrawal. In this respect, it can be seen that through the single switching movement of the locking lever 27, both the vehicle-sensitive control system and the belt-webbing-sensitive control system is cut off or functionally disabled.

It can also be seen from FIG. 5 that as an additional security measure for the disabling of the control systems, a locking tooth 33 projecting in the direction of the shaft extension 11 of the belt shaft 10 is formed on the lever 27. In the cutoff position of the locking lever 27 (FIG. 5), the locking tooth 33 comes into engagement with a peripheral recess 34 provided on the periphery of the shaft extension 11, so that in this engagement position the belt shaft 10 and the control disc 13 are non-rotatably locked with each other. Therefore, relative rotation between the control disc 13 and the belt shaft 10, which is necessary for the blocking of the belt retractor, is prevented.

The belt retractor may also have an ALR/ELR switchover function. For this function, a separate switching lever 28 is mounted on the platform 14. In the ALR switching position, in which the control disc 13 is secured against further rotation, the switching lever is to be swiveled outwards to engage with the toothing 20 of the housing cap 19.

In order to carry out the corresponding swivelling and switching movements of the locking lever 27 and switching lever 28, the two levers have a guide pin, 27a and 28a, respectively, wherein these guide pins 27a, 28a are guided in the cams 18 of the wobble plate 17, so that controlling the movements of the locking lever 27 and switching lever 28 takes place via the rotation of the wobble plate 17.

Figure 6:
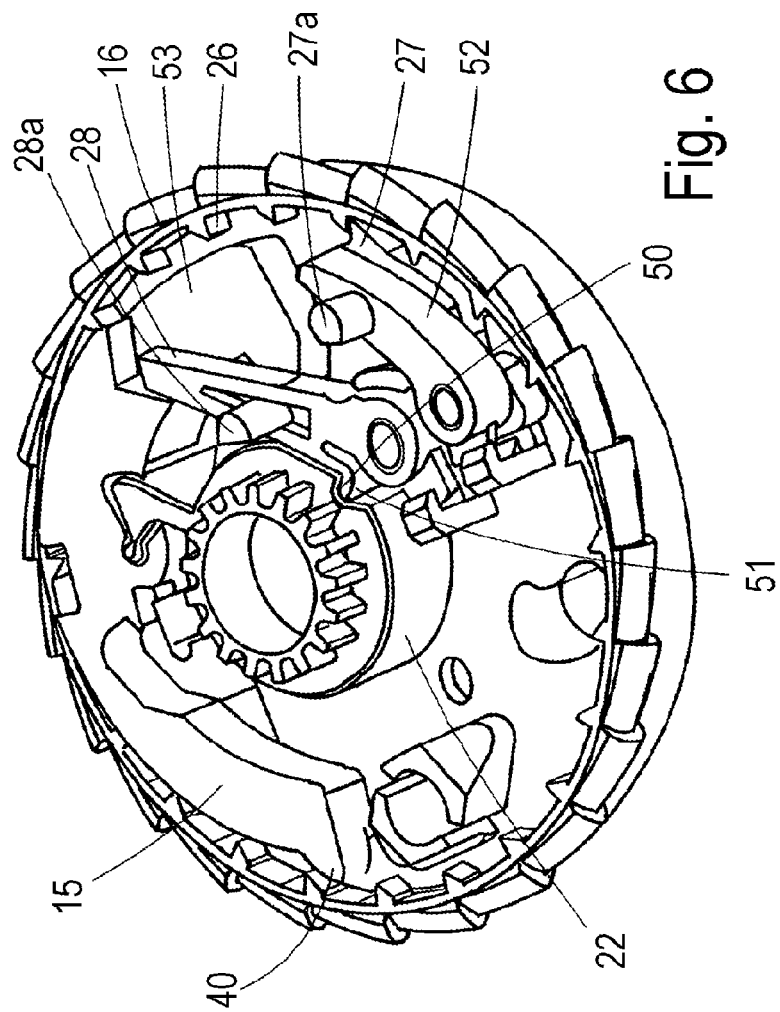
FIG. 6 is a perspective view of the control disc of FIGS. 4 and 5 according to another embodiment of the present invention with activation of the vehicle-sensitive and of the belt-webbing-sensitive control system in ELR operation.
Figure 7:
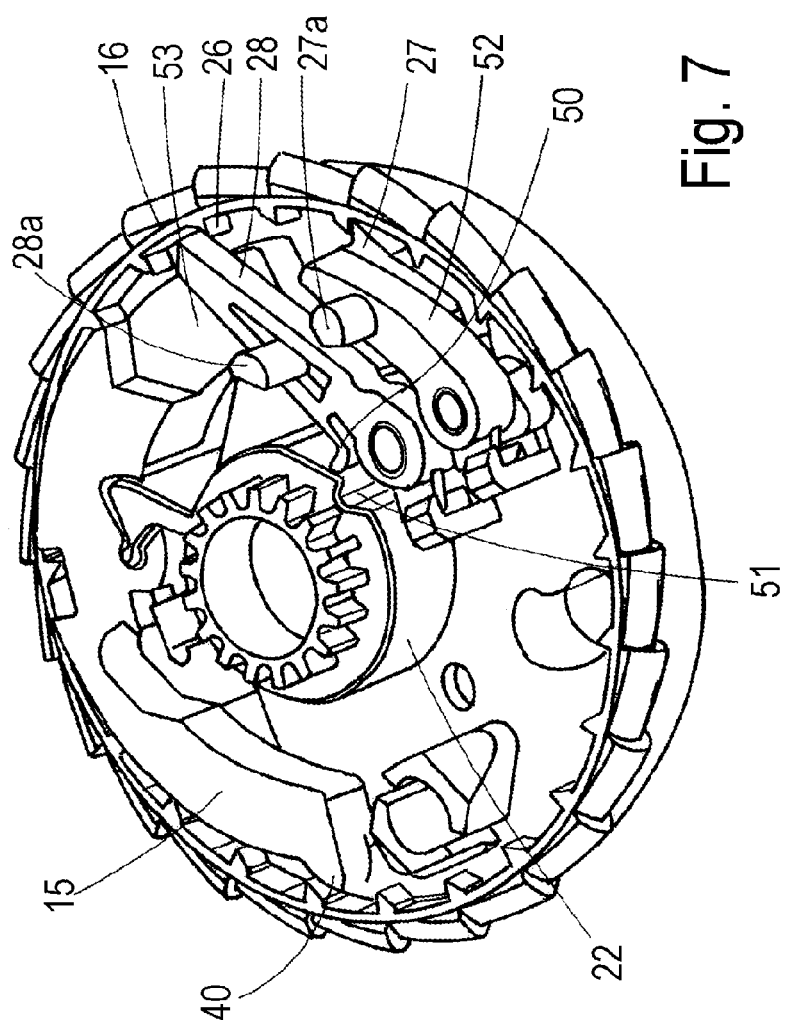
FIG. 7 is a perspective view of FIG. 6 in ALR operation.
Figure 8:
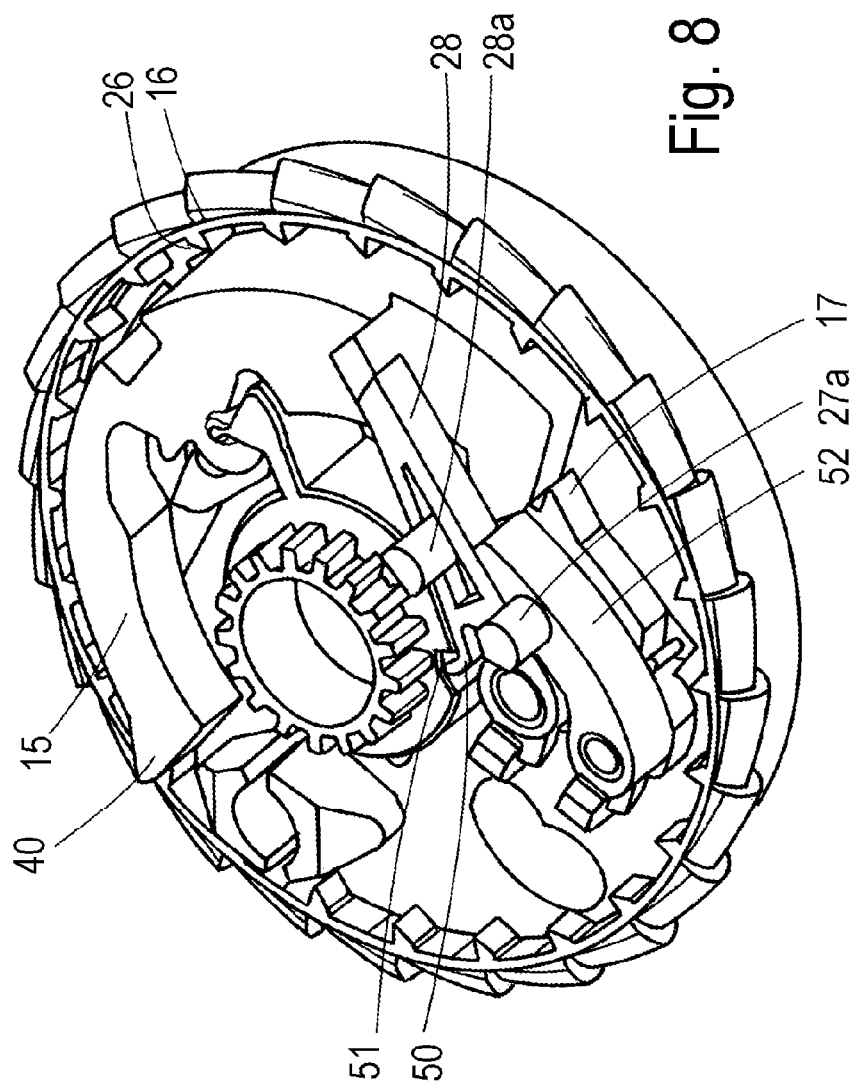
FIG. 8 is a perspective view of FIGS. 6 and 7 wherein the vehicle-sensitive and the belt-webbing-sensitive control system are cutoff.

FIGS. 6-8 illustrate an alternative embodiment of the control disc 13 with the functional parts arranged thereon.

Insofar as the control disc 13 illustrated in FIG. 6 in its functional position during activation of both the vehicle-sensitive and the belt-webbing-sensitive control system, i.e. in the ELR switching state, corresponds to the embodiment illustrated in FIG. 4 and already described, those features are denoted by identical reference characters and will not be described in detail below. The embodiment illustrated in FIG. 6 shows the locking lever 27 in the deflected position and in engagement with the inner toothing 26 of the ring 16. The switching lever 28 is situated in its swiveled-in position, wherein the switching lever 28 engages with an inner spring arm 50 into a recess 51 formed on the extension 22 of the platform 14 of the control disc 13. In the illustrated embodiment, the locking lever 27 and switching lever 28 are arranged in different planes staggered in an axial direction of the control disc 13. The locking lever 27 has an attachment 52 extending into the plane of movement of the switching lever 28 and carrying the guide pin 27a. As will be described in greater detail below, the attachment 52 cooperates with the switching lever 28 in a switching position of the locking lever 27. At the same time, the inertial mass 15 axially extends along its height over both movement planes of the locking lever 27 and switching lever 28. In addition, the inertial mass 15 has a cutout 53, arranged in the movement plane of the switching lever 28, to receive the switching lever 28 so that the switching lever 28 respectively follows the control movements of the inertial mass 15. With this step, a space-saving construction of the control disc 13 is achieved with the functional parts formed thereon. The arrangement of the attachment 52 lying in the movement plane of the switching lever 28 on the locking lever 27 helps bring about the disabling of the belt-webbing-sensitive control system. In particular, for the case where a cutoff of the guide pin 28a situated on the switching lever 28 were to occur due to a very rapid belt webbing withdrawal reaching the ELR/ALR switchover point, the foregoing arrangement brings the switching lever 28 and hence the belt-webbing-sensitive control system in its cutoff position via the cutoff movement of the locking lever 27 by means of the associated cam, and at the same time, via the abutment of the attachment 52 on the switching lever 28, in which case a blocking of the belt shaft is no longer possible.

In FIG. 7, the control disc 13 of FIG. 6 is illustrated in the ALR switching state. As can be seen, the switching lever 28 is swiveled radially outwards, wherein its spring arm 50 has emerged out of the recess 51 and lies with a corresponding pre-stressed tension on the extension 22 of the platform 14. If a controlling back of the switching lever 28 occurs on the switchover from the ALR switching state into the ELR switching state, the spring arm 50 engages again into the recess 51, so that the ELR switching state is defined.

In FIG. 8, the cutoff of both the vehicle-sensitive and the belt-webbing-sensitive control system is illustrated, in which the locking lever 27 is guided inwards out of engagement with the inner toothing 26 of the ring 16. In so doing, the locking lever 27 at the same time secures the inertial mass 15, so that the belt-webbing-sensitive control system cannot respond. At the same time, the switching lever 28 is in a swiveled-in position, so that no blocking of the belt shaft can be brought about.

Figure 9:
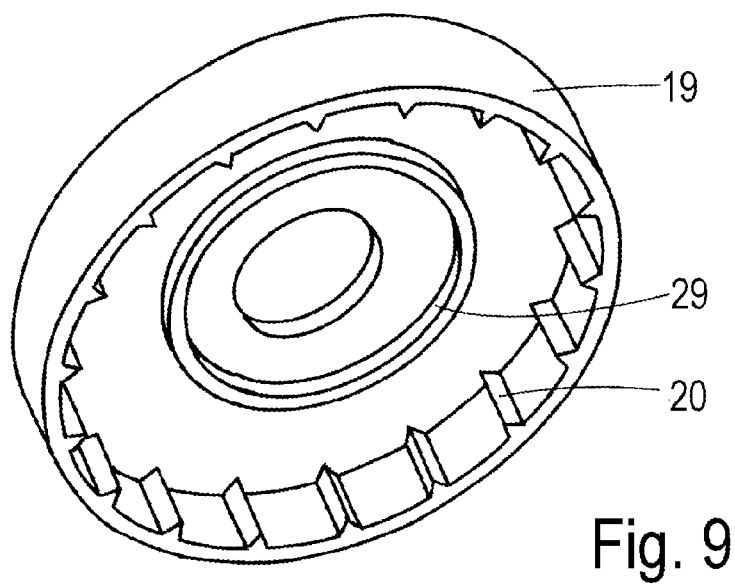
FIG. 9 is a perspective view of a cutout of a housing cap.
Figure 13:
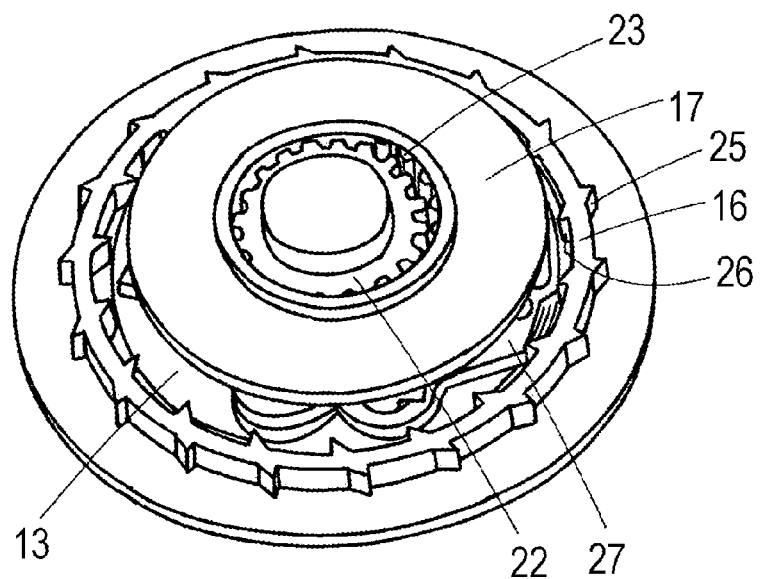
FIG. 13 is a perspective view of the control disc placed in combination with the wobble plate.

As can be seen from FIG. 9, an eccentric bearing 29 for the wobble plate 17 is formed on the inner side of the housing cap 19, so that the rotary drive of the wobble plate 17, brought about via the engagement of the inner toothing 23 of the wobble plate 17 with the externally toothed extension 22 of the control disc 13 or the platform 14, is able to be converted at the same time into an eccentric-radial displacement of the wobble plate 17.

In FIGS. 10 and 11, the construction of the wobble plate 17 is shown, wherein the wobble plate 17 is arranged to control the switching movements of the locking lever 27 and switching lever 28. As can be seen firstly from FIG. 10, the wobble plate 17 has a strip 54 extending over its periphery and projecting axially into the plane of the guide pins 27a, 28a of the locking lever 27 and switching lever 28, respectively. The wobble plate 17 also has a bearing ring 55, projecting parallel to the strip 54, for the bearing of the wobble plate 17. The strip 54 is arranged with a radial distance to both the bearing ring 55 and the outer periphery of the wobble plate 17. Moreover, an inner cam 30 and an outer cam 31 respectively formed on the inner and outer side of the strip 54 is provided for the guide pin 27a of the locking lever 27, and at least one opening 32 is provided as a radial transition section for the passage of the guide pin 27a between the inner cam 30 and the outer cam 31.

On their running paths for the guide pins 27a, 28a of the locking lever 27 and switching lever 28, the cams 30, 31 have an undulating contour for equalizing the movements of the wobble plate with respect to the guide pins 27a, 28a of the locking lever 27 and switching lever 28, revolving with the control disc 13. Owing to the strip 54, extending over the entire periphery, with cams 30, 31, the guide pin 27a of the locking lever 27 is guided during the entire rolling and unrolling movement of the belt shaft 10 on the cams 30, 31. The wobble plate 17 is designed so that a full revolution of the wobble plate 17 corresponds to the revolutions of the belt shaft 10 carried out during the unwinding or winding of the belt webbing between the complete winding state and the complete unwinding state. Depending on the length of the belt webbing wound on the belt shaft 10 of the belt retractor, the belt shaft 10 can carry out 14 to 16 revolutions, for example, with a complete revolution of the wobble plate 17.

To control the switching lever 28, the wobble plate 17 additionally has a third cam 56, which is formed by the outer periphery of the bearing ring 55 of the wobble plate 17. In addition, at the switchover point from the ELR to the ALR switching state of the belt retractor with almost complete belt webbing withdrawal, a radial cross-piece 57 is arranged between the bearing ring 55 and the strip 54 for the radial guidance of the guide pin 28*a* of the switching lever 28 out of its cam 56 for the ELR switching state and up to abutment against the inner cam 30 of the strip 54 during the ALR state, wherein with the unrolling movement of the belt webbing from the belt shaft, the guide pin 28*a* reaches the cross-piece 57 at the end of the belt webbing withdrawal and is re-routed by the cross-piece 57 into its swiveled-out position. In addition, the strip 54 has a section 58 in the region of its inner cam 30, wherein the section 58 is directed radially inwards to the bearing ring 55. In this manner, after a rolling movement of the belt webbing, (i.e., corresponding to the path of the guide pin 28*a* of the switching lever 28 from the cross-piece 57 along the inner cam 30), onto the belt shaft of the guide pin 28*a*, a re-routing takes place from the inner cam 30 to the cam 56 on the bearing ring 55, whereby the ELR switching state is reproduced.

In FIG. 11, the path of the guide pin 27*a* for controlling the locking lever 27, and the path of the guide pin 28*a* for controlling the switching lever 28, is shown for the control contour illustrated in FIG. 10. Here, the guide pin 27*a* is illustrated in the position with a fully wound belt webbing; the illustration in dashed lines makes it clear that in particular embodiments a greater amount of belt webbing can be wound on the belt shaft 10. As can be seen from the illustration of the path line 59 for the movement of the guide pin 27*a*, at the start of the unwinding of the belt webbing, the guide pin 27*a* firstly follows the inner cam 30 up to the opening 32, by which the guide pin 27*a* is deflected radially outwards. Then, on further unwinding of the belt webbing, the guide pin 27*a* follows the outer cam 31, in which the locking lever 27 is guided in engagement with the toothing 26 of the ring 16, and hence produces the function of the control disc 13. Accordingly, on winding of the belt webbing, the control pin 27 follows the path line 59 up to its initial position.

Correspondingly, for the movement of the guide pin 28*a* of the switching lever 28, the path line 60 is similarly illustrated in FIG. 11, and it can be seen here that the guide pin 28*a*, firstly up to reaching the switchover point defined by the cross-piece 57, is guided on the cam 56 of the bearing ring 55, whereby the swiveled-in position of the switching lever 28 is defined. When the belt webbing is (almost) completely unwound from the belt shaft and therefore the ALR switching state is to be brought about, the guide pin 28*a* is deflected radially outwards via the cross-piece 57. If after a certain extent of winding of the belt webbing onto the belt shaft 10, a switching over is to take place again from the ALR switching state to the ELR switching state, then firstly the guide pin 28*a* follows the inner cam 30, during the return rotation of the belt shaft 10, until the guide pin 28*a* reaches the section 58 arranged in the region of the opening 32, via which the guide pin 28*a* is guided back in abutment against the bearing ring 55, and hence into the path of the cam 56, in which the switching lever 28 is not engaged with the toothing 20 of the housing cap 19.

Figure 12:
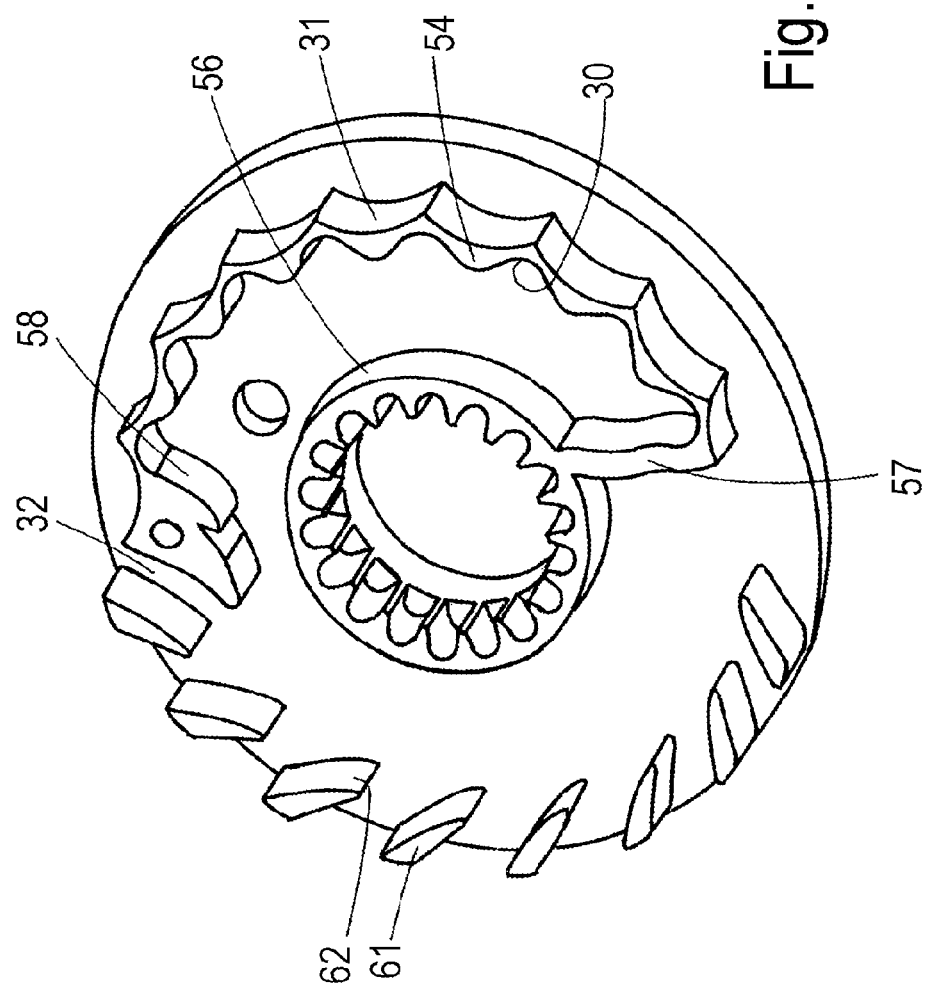
FIG. 12 is a perspective view of the wobble plate of FIG. 10 according to another embodiment of the present invention.

In FIG. 12, another embodiment of the wobble plate 17 is illustrated. Here, the strip 54 with the cams 30, 31 formed thereon extends only over a partial region of the periphery of the wobble plate 17, wherein the partial region is traveled through by the guide pin 27*a* of the locking lever 27 after initial belt webbing withdrawal, wherein the guide pin 27*a* is in a position such that it is guided outwards to engage with the inner toothing 26 of the ring 16. In the other, remaining peripheral region, radially outwardly directed cross-pieces 60 are arranged on the wobble plate 17 such that with corresponding control movements, the guide pin 27*a* of the locking lever 27 can enter between the cross-pieces 61. Insofar as the control pin 27*a*, with initial belt webbing withdrawal, travels in the peripheral direction through a curved line, the cross-pieces 61 are arranged with an adapted position, aligned obliquely to the peripheral direction, and have at their inner end a flattened introduction surface 62 for the guiding of the guide pin 27*a* into the spaces respectively existing between the cross-pieces 61. As such, in the case of high initial accelerations of a belt webbing withdrawal, the guide pin 27*a* does not strike against the cam 30 formed in this region (i.e., according to the embodiment described with respect to FIGS. 10 and 11), and does not break off under these circumstances. Rather, the guide pin 27*a* can enter radially outwards into the spaces existing between the cross-pieces 61 and in so doing, the guide pin 27*a* is not subject to any stress. Since in such a case of a high acceleration of belt webbing withdrawal, the belt-webbing-sensitive control system would at the same time respond with a blocking of the belt shaft 10, further rotation of the belt shaft 10 would be prevented, so that the guide pin 27*a* no longer carries out a movement in the peripheral direction of the wobble plate 17. If the belt webbing is slackened to release this blocking state, the guiding pin 27*a* slips out of the region of the cross-pieces 61 again, and can then take its path up to the opening 32 with a correspondingly slower withdrawal movement.

Figure 14:
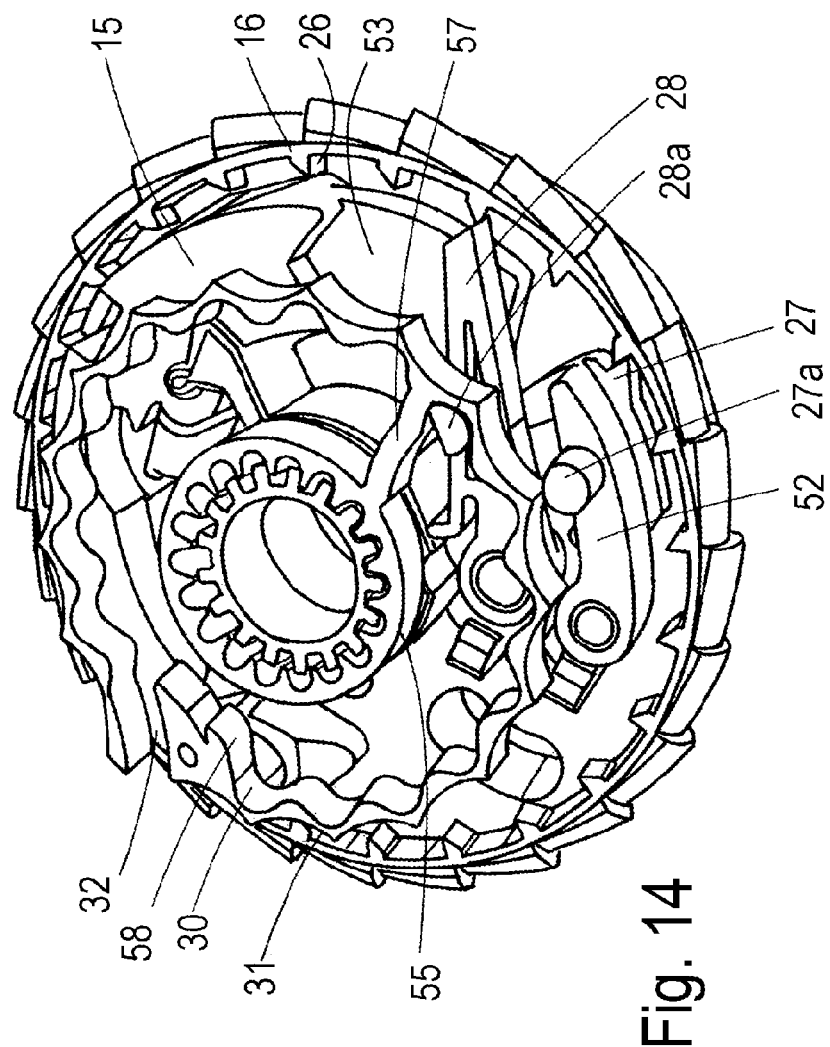
FIG. 14 is a perspective view of the control disc according to FIG. 7, the control disc including associated cams of the wobble plate in ALR operation.
Figure 15:
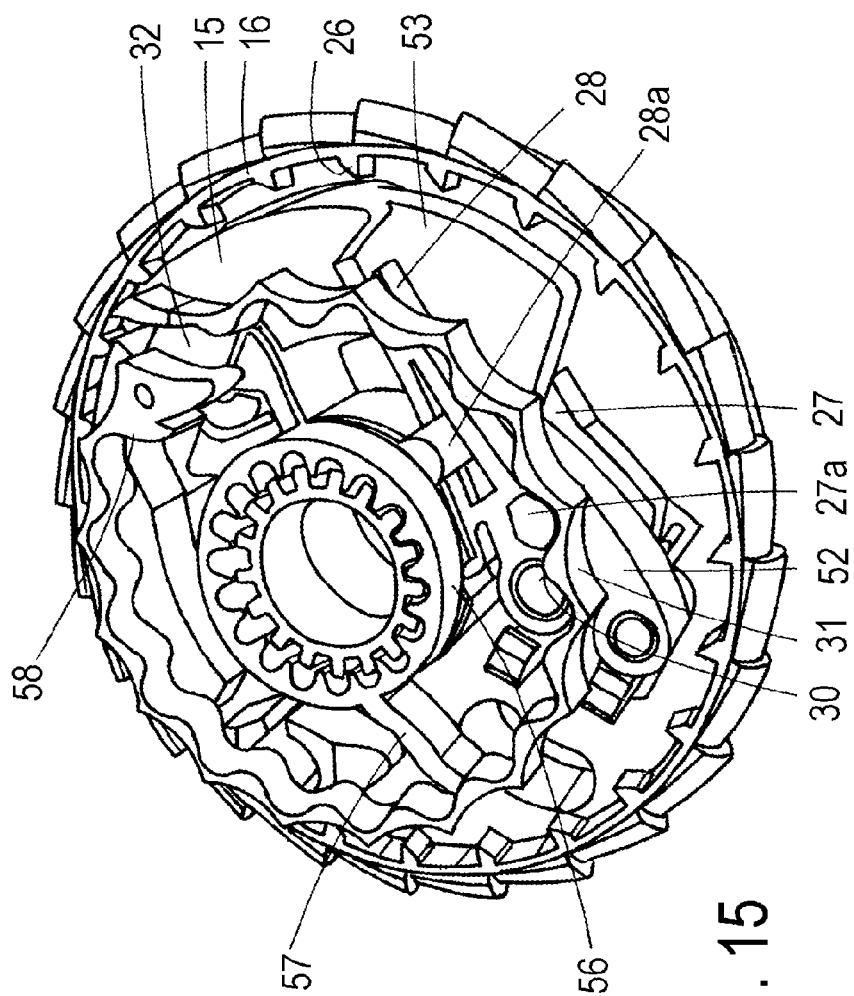
FIG. 15 is a perspective view of the control disc according to FIG. 8, the control disc including associated cams of the wobble plate during cutoff of the vehicle-sensitive and of the belt-webbing-sensitive control system.

In FIGS. 14 and 15, respectively, the control disc 13 is again illustrated with the levers 27, 28 arranged thereon and in cooperation with the cams 30, 31, 56 of the wobble plate 17. Here, FIG. 14 in turn shows the ALR switching state, in which the switching lever 28 is in its guided-out position in engagement with the toothing 20 of the housing cap 19, in which the guide pin 28*a* lies against the inner cam 30 of the strip 54. In this position, the locking lever 27 is guided into the outer toothing 26 of the ring 16, and in this respect, the guide pin 27*a* lies against the outer cam 31. In this respect, therefore, an immediate readiness for blocking exists in the case of a belt webbing withdrawal, as is provided for the ALR operation.

FIG. 15 once again shows the state in which both the vehicle-sensitive and the belt-webbing-sensitive control system is cut off. In this respect, the guide pin 27*a* of the locking lever 27 is guided on the inner cam 30, so that the locking lever 27 is not in engagement with the outer toothing 27 of the ring 16, and so that the ring 16 rotates on access of the vehicle sensor and no blocking is initiated. At the same time, the locking lever 27 lies against the inertial mass 15 and therefore blocks the response of the belt-webbing-sensitive control system. The switching lever 28 lies in its inner position with abutment of the guide pin 28*a* against the control cam 56, which, however, is without functional significance for the cutoff of the belt-webbing-sensitive and vehicle-sensitive control system.

The features of the subject matter of the present invention, as disclosed in the above description, the claims, the abstract, and the drawings, can be essential individually and also in any desired combinations with each other for the realization of the invention in its various embodiments.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A self-locking belt retractor for motor vehicles including a vehicle-sensitive and a belt-webbing-sensitive control system for a blocking arrangement of the belt retractor with a blocking catch to be guided into a toothing fixed to a housing, the control system comprising:
   a control disc coupled to the blocking catch and rotatable with a belt shaft, the control disc having an inertial mass mounted thereon for swiveling motion for forming a belt-webbing-sensitive control, the inertial mass being deflectable into a blocking position for the control disc, wherein the control disc further includes an outer toothing for engaging a sensor lever arranged on a vehicle sensor;
   at least one locking lever controllable by rotation of the belt shaft, the at least one locking lever being mounted on the control disc for swiveling motion and movable between an activation position and a cutoff position, wherein the locking lever is in the cutoff position in a functional range of the safety belt webbing, in which at most a predetermined amount of safety belt webbing is wound on the belt shaft;
   wherein a switching operation of the locking lever into the cutoff position disables the vehicle sensor and secures the inertial mass in a disabling position, the disabling position being different than the blocking position,
   wherein the control disc is constructed as a two-part structure comprising a first part and a second part,
   the first part including a rotatable platform coupled to the belt shaft, the rotatable platform being configured as a carrier for the inertial mass and the locking lever, and
   the second part including an outer ring rotatable with respect to the platform, the outer ring having an inner toothing for engaging the locking lever in the activation position, and the outer toothing for engaging the sensor lever of the vehicle sensor, the outer ring being disengaged from the locking lever and freely rotatable relative to the rotatable platform over an unlimited angular range when the locking lever is in the cutoff position.

2. The self-locking belt retractor according to claim 1, wherein the inertial mass has a blocking tooth and engages with a peripheral toothing when the inertial mass is in the blocking position, the peripheral toothing being formed on an inner side of a housing cap overlapping the control system.

3. A self-locking belt retractor for motor vehicles including a vehicle-sensitive and a belt-webbing-sensitive control system for a blocking arrangement of the belt retractor with a blocking catch to be guided into a toothing fixed to a housing, the control system comprising:
   a control disc coupled to the blocking catch and rotatable with a belt shaft, the control disc having an inertial mass mounted thereon for swiveling motion for forming a belt-webbing-sensitive control, the inertial mass being deflectable into a blocking position for the control disc, wherein the control disc further includes an outer toothing for engaging a sensor lever arranged on a vehicle sensor;
   at least one locking lever controllable by rotation of the belt shaft, the at least one locking lever being mounted on the control disc for swiveling motion and movable between an activation position and a cutoff position, wherein the locking lever is in the cutoff position in a functional range of the safety belt webbing, in which at most a predetermined amount of safety belt webbing is wound on the belt shaft;
   wherein a switching operation of the locking lever into the cutoff position disables the vehicle sensor and secures the inertial mass in a disabling position, the disabling position being different than the blocking position,
   wherein the inertial mass has a blocking tooth and engages with a peripheral toothing when the inertial mass is in the blocking position, the peripheral toothing being formed on an inner side of a housing cap overlapping the control system,
   the self-locking belt retractor further comprising a switching lever mounted thereon for a swiveling motion, the switching lever being configured to provide a switchover between an ALR switching state and an ELR switching state,
   wherein the switching lever is guided into engagement with the peripheral toothing of the housing cap when the switching lever is in an ALR switching position, and
   wherein the switching lever is not in engagement with the peripheral toothing of the housing cap when the switching lever is in an ELR switching position.

4. The self-locking belt retractor according to claim 3, wherein a spring arm is formed on the switching lever the spring arm engaging in a recess of an extension of the control disc, wherein the spring arm becomes disengaged from the recess when the spring arm is radially deflected into an ALR switching position.

5. The self-locking belt retractor according to claim 3, further comprising a wobble plate disposed adjacent to the control disc and drivable by the belt shaft, the wobble plate being configured to simultaneously control the locking lever and the switching lever, wherein the wobble plate includes a pair of cams formed thereon, the pair of cams being configured to respectively guide a guide pin formed on the locking lever and a guide pin formed on the switching lever.

6. The self-locking belt retractor according to claim 5, wherein the wobble plate includes an eccentrically arranged, internally toothed bearing bore for engaging an externally toothed extension of the control disc.

7. The self-locking belt retractor according to claim 5, wherein the wobble plate is guided in a bearing formed eccentrically in the housing cap.

8. The self-locking belt retractor according to claim 5, wherein the wobble plate has a strip extending at partially least over a periphery of the wobble plate and projecting axially into a plane defined by the guide pins of the locking lever and the switching lever, and
   wherein the wobble plate further has a bearing ring projecting parallel to the strip for the formation of the pair of cams for guiding the guide pins of the locking lever and the switching lever.

9. The self-locking belt retractor according to claim 8, wherein the strip is arranged with a radial distance from both the bearing ring and an outer periphery of the wobble plate,
   wherein the strip includes an inner cam formed on an inner side of the strip and an outer cam formed on an outer side of the strip, and
   wherein at least one opening is provided as a radial transition section for passage of the guide pin of the locking lever between the inner cam and the outer cam.

10. The self-locking belt retractor according to claim 9, wherein the inner and outer cams have an undulating contour on respective running paths for the guide pins of the locking lever and the switching lever, the undulating contour being configured to equalize movements of the wobble plate with respect to the guide pins of the locking lever and the switching lever revolving with the control disc.

11. The self-locking belt retractor according to claim 8, wherein the strip completely extends over the periphery of the wobble plate such that the guide pin of the locking lever is guided on the pair of cams during an entire rolling and unrolling movement of the belt webbing.

12. The self-locking belt retractor according to claim 8, wherein the strip only extends over a partial region of the periphery of the wobble plate, wherein the partial region is travelled through by the guide pin of the locking lever after initial belt webbing withdrawal, in which the guide pin is in an outwardly guided position and in engagement with an inner toothing of an outer ring of the control disc, and wherein radially outwardly directed cross-pieces, spaced apart from each other, are arranged in a remaining region of the periphery of the wobble plate, the cross-pieces being configured to receive the guide pin of the locking lever between them.

13. The self-locking belt retractor according to claim 12, wherein the guide pin of the locking lever travels in a peripheral direction during initial belt webbing withdrawal, wherein the cross-pieces are arranged with an adapted position aligned obliquely to the peripheral direction, and wherein at the inner end of the cross-pieces, the cross-pieces have a flattened introduction surface for guiding in of the guide pin of the locking lever between the cross-pieces.

14. The self-locking belt retractor according to claim 8, wherein an outer periphery of bearing ring forms a third cam for controlling the guide pin of the switching lever when the switching lever is in the ELR switching position.

15. The self-locking belt retractor according to claim 14, wherein the guide pin of the switching lever is directed to the bearing ring of the wobble plate and includes a contact surface formed with a curvature corresponding to an outer curvature of the bearing ring.

16. The self-locking belt retractor according to claim 14, wherein a radial cross-piece is arranged between the bearing ring and the strip, the radial cross-piece being configured to radially guide the guide pin of the switching lever out from the third cam in the ELR switching position and into abutment against the inner cam of the strip during the ALR switching state, the ALR switching state occurring at an end of the belt webbing withdrawal, and wherein, at a peripheral distance from the radial cross-piece, the inner cam has a section directed radially inwards to the bearing ring for guiding the guide pin of the switching lever from the inner cam of the strip to the third cam of the bearing ring.

17. The self-locking belt retractor according to claim 5, wherein the locking lever and the switching lever are arranged in different planes staggered in an axial direction of the control disc, wherein the locking lever has an attachment carrying the guide pin of the locking lever and extending into a movement plane of the switching lever, and wherein at least one switching position of the locking lever cooperates with the switching lever.

18. The self-locking belt retractor according to claim 17, wherein the inertial mass axially extends along its height over a movement plane of the locking lever and the movement plane of the switching lever, and wherein the inertial mass has a cutout to receive the switching lever, the cutout being arranged in the movement plane thereof.

19. The self-locking belt retractor according to claim 5, wherein the control disc comprises functional parts including the inertial mass, the locking lever, and the switching lever mounted thereon, wherein, with the functional parts and the wobble plate, the control disc is able to be inserted into the housing cap and secured thereon, thereby forming a pre-mounted assembly, and wherein the housing cap is formed in a cup-like shape.

20. The self-locking belt retractor according to claim 5, wherein the control disc and the wobble plate are arranged together on an adapter piece, the adapter piece being securable on the housing cap and on an extension of the belt shaft, thereby forming a bearing of the belt shaft in the housing cap.

21. The self-locking belt retractor according to claim 20, wherein the adapter piece is able to be respectively engaged with the housing cap and the shaft extension.

22. The self-locking belt retractor according to claim 20, wherein the adapter piece is secured in a form fit on the shaft extension.

23. The self-locking belt retractor according to claim 20, wherein the adapter piece carries the control disc on an encircling flange and thereby forms a pre-mounted assembly which is to be engaged with the housing cap, and wherein the shaft extension is able to be inserted into the adapter piece, the adapter piece being secured on the housing cap.

* * * * *

UNITED STATES PATENT AND TRADEMARK OFFICE
CERTIFICATE OF CORRECTION

PATENT NO.      : 8,579,223 B2                                          Page 1 of 1
APPLICATION NO. : 12/517303
DATED           : November 12, 2013
INVENTOR(S)     : Guillem Aranda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this
Twenty-second Day of September, 2015

Michelle K. Lee
*Director of the United States Patent and Trademark Office*